(12) United States Patent
Vos et al.

(10) Patent No.: US 6,640,175 B2
(45) Date of Patent: Oct. 28, 2003

(54) WEIGHT BASED OCCUPANT CLASSIFICATION SYSTEM FOR CONTROLLING ENABLEMENT OF A PROTECTION DEVICE

(75) Inventors: Thomas H. Vos, Oxford, MI (US); Robert E. Resh, Dryden, MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/925,361

(22) Filed: Aug. 9, 2001

(65) Prior Publication Data

US 2003/0033065 A1 Feb. 13, 2003

(51) Int. Cl.$^7$ .............................................. B60R 22/00
(52) U.S. Cl. .......................... 701/45; 701/46; 701/36; 280/733; 280/735; 180/268; 180/272
(58) Field of Search ........................... 701/45, 46, 36; 280/733, 735, 728.1, 734; 180/268, 272, 282; 307/9.1, 10.1; 340/436, 438, 439

(56) References Cited

U.S. PATENT DOCUMENTS 3,672,699 A * 6/1972 De Windt ................... 280/735
5,474,327 A * 12/1995 Schousek .................. 280/728.3
5,877,677 A * 3/1999 Fleming et al. ............. 340/436
6,018,693 A 1/2000 Blackburn et al. ............ 701/45
6,138,067 A 10/2000 Cobb et al. .................... 701/45
6,246,936 B1 * 6/2001 Murphy et al. ................ 701/45
6,260,879 B1 * 7/2001 Stanley ........................ 280/735
6,282,473 B1 * 8/2001 Steffens, Jr. ................. 701/45

* cited by examiner

Primary Examiner—Marthe Y. Marc-Coleman
(74) Attorney, Agent, or Firm—Tarolli, Sundheim, Covell & Tummino L.L.P.

(57) ABSTRACT

A method and associated apparatus for controlling actuation of a protection device for an occupant of a vehicle seat (12) includes the steps of: determining (44) when an output signal of a weight sensor rises from an initial value; waiting (46) a predetermined period of time ($T_2$) after the output signal rises from the initial value; determining (48) the weight on the vehicle seat after the predetermined period of time ($T_2$); comparing (50) the weight on the vehicle seat after the predetermined period of time with a first threshold weight ($W_1$); enabling (52) actuation of the protection device if the weight on the vehicle seat after the predetermined period of time exceeds the first threshold weight; and disabling (54) actuation of the protection device if the weight on the vehicle seat after the predetermined period of time does not exceed the first threshold weight.

25 Claims, 5 Drawing Sheets

WEIGHT BASED OCCUPANT CLASSIFICATION SYSTEM FOR CONTROLLING ENABLEMENT OF A PROTECTION DEVICE

BACKGROUND OF THE INVENTION

The present invention relates to a vehicle occupant protection device. In particular, the present invention relates to a method and apparatus using a weight based occupant classification system for controlling the enabling and disabling of actuation of a protection device for an occupant of a vehicle seat.

DESCRIPTION OF RELATED ART

It is known to disable a vehicle occupant protection device, such as an air bag for an occupant of a vehicle seat, if it is determined that the occupant of the seat is under a certain weight. Various methods have been proposed for determining the occupant weight, typically involving the use of weight sensors in the seat. With a weight sensor, it may be important to distinguish between the weight of an adult seated in the seat, of a child seated in a child seat, of a child seat cinched down tight in the vehicle seat, and of an adult in the process of cinching the child seat down.

The typical weight threshold for distinguishing between a child and an adult is the 60–70 pound range of seated weight, that is, the sensed weight on the seat bottom cushion, not including any weight that may be transferred to the floor through the legs of an occupant. One-time sensing of seated weight in excess of this threshold, by itself, may not always be sufficient to discriminate properly between a child and an adult. For example, a six year old child, weighing in the range of 50 pounds, can be seated on a child seat weighing up to 20 pounds, for a total seated weight in the range of 70 pounds. Cinching the child seat down on the vehicle seat, with the seat belt, can increase the seated weight to an amount in the range of 70 pounds to 80 pounds. This is a seated weight that is in the range of the seated weight of some adults, for example, a small female with a total body weight of 108 pounds where a portion of the weight, up to 30 pounds or more, rests on the floor. In this child seat case, actuation of an air bag inflator might be enabled when it should preferably be disabled.

As another example, an adult may kneel on a child seat to cinch the child seat down with a seat belt, temporarily increasing the seated weight to a weight in the range of 100 pounds or more. Again, in this case, actuation of the air bag system might be enabled when it should preferably be disabled.

SUMMARY OF THE INVENTION

The present invention is a method of controlling enabling and disabling of actuation of a protection device for an occupant of a vehicle seat having a weight sensor. The method comprises the steps of:

continually sensing the weight on the vehicle seat and providing an output signal indicative of the sensed weight;

determining when the value of the output signal of the weight sensor rises from an initial value;

waiting a predetermined period of time after the value of the output signal rises from the initial value;

determining the weight on the vehicle seat after the predetermined period of time;

comparing the weight on the vehicle seat after the predetermined period of time with a first threshold weight;

enabling actuation of the protection device if the weight on the vehicle seat after the predetermined period of time exceeds the first threshold weight; and disabling actuation of the protection device if the weight on the vehicle seat after the predetermined period of time does not exceed the first threshold weight.

The present invention is also an apparatus for controlling enabling and disabling of actuation of a protection device for an occupant of a vehicle seat having a weight sensor. The apparatus comprises a sensor for sensing the weight on the vehicle seat and for providing an output signal indicative of the sensed weight. The output signal has an initial value. The apparatus also comprises means for determining when the value of the output signal rises from the initial value, and means for determining the weight on the vehicle seat at a predetermined period of time after the value of the output signal rises from the initial value. The apparatus further comprises means for comparing the weight on the vehicle seat after the predetermined period of time with a first threshold weight. The comparing means enables actuation of the protection device if the weight on the vehicle seat after the predetermined period of time exceeds the first threshold weight. The comparing means disables actuation of the protection device if the weight on the vehicle seat after the predetermined period of time does not exceed the first threshold weight.

BRIEF DESCRIPTION OF THE DRAWINGS

The foregoing and other features of the invention will become apparent to one skilled in the art to which the invention relates upon consideration of the following description of the invention with reference to the accompanying drawings, in which.

DETAILED DESCRIPTION OF THE INVENTION

The present invention relates to a vehicle occupant protection device. In particular, the present invention relates to a method and apparatus using a weight based occupant classification system for controlling the enabling and disabling of actuation of a protection device for an occupant of a vehicle seat.

Figure 1:
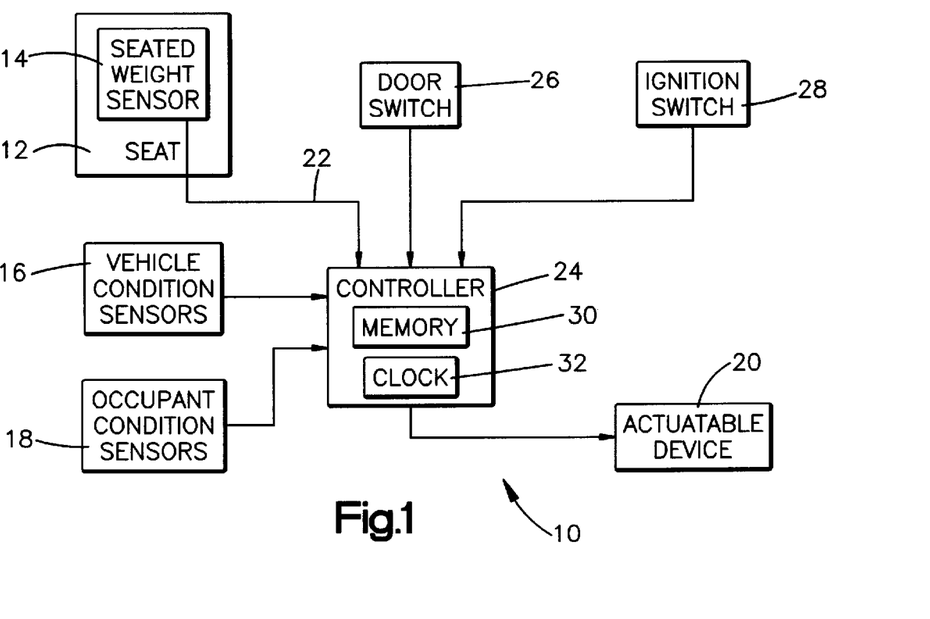
FIG. 1 is a block diagram of an apparatus in accordance with the invention.

As representative of the present invention, FIG. 1 illustrates an apparatus 10 in accordance with a first embodiment of the present invention. The apparatus 10 includes a vehicle seat indicated schematically at 12, such as a front passenger seat of a vehicle.

The apparatus 10 also includes an actuatable device 20 to help protect an occupant of the seat 12. In the embodiment described, the actuatable device 20 is an inflator for an air bag. In another embodiment, the actuatable device 20 could be another type of vehicle occupant protection device, such as an inflator for a side curtain or an actuator for a knee bolster. The inflator 20 is electrically actuatable to inflate an air bag (not shown) to help protect an adult occupant of the vehicle seat 12.

The apparatus 10 includes a controller 24. In the event of a crash condition involving sudden vehicle deceleration or other event for which protection of the vehicle occupant may be desired, one or more vehicle condition sensors 16 and/or occupant condition sensors 18 provide appropriate output signals that are inputs to the controller 24. The controller 24 compares the outputs of the sensors with outputs found in a look-up table, for example. Depending on the outcome of this comparison, the controller 24 determines whether or not to actuate the inflator 20 and deploy the air bag.

In the manner described below, actuation of the inflator 20 may be disabled, that is, the apparatus 10 may be placed into a condition in which the inflator is not actuatable even in a crash condition, if it is determined that the occupant of the seat 12 is under a certain weight. Alternatively, actuation of the inflator 20 may be enabled, that is, the apparatus 10 may be placed into a condition in which the inflator is actuatable in a crash condition, if it is determined that the occupant of the seat 12 is above a certain weight.

A weight sensor indicated schematically at 14 is located in the seat 12. The weight sensor 14 can be any known device including but not limited to pressure pattern sensors, pressure bladders, strain gages, etc., that may determine weight directly or by inference. The weight sensor 14 is capable of sensing the weight of a vehicle occupant and/or child seat located on the vehicle seat 12, and providing an output signal indicative of the seated weight. For an adult seated in the seat 12, with feet on the vehicle floor, the seated weight represents the portion of the adult's weight that is carried by the seat bottom cushion, as opposed to being transmitted through the adult's feet to the floor. For a small child or a child seat, the seated weight represents the entire weight of the child or the child seat, because the legs do not touch the floor.

The weight sensor 14 is operative to sense weights over a large range, from zero to in excess of 150 pounds. Specifically, the weight sensor 14 is operative to sense weight up to and in excess of a first threshold weight W1. $W_1$ is a weight indicative of the presence of an adult in the seat 12, not a child and not a child-plus-child-seat combination. The typical seated weight of an adult is in the range of 80 to 150 pounds. Therefore, the first threshold weight $W_1$ may be set in the range of from 60 to 80 pounds.

The weight sensor 14 is also operative to sense weight down to and below a second threshold weight $W_2$. The second threshold weight $W_2$ is less than the first threshold weight $W_1$. The second threshold weight $W_2$ is a weight indicative of the absence of an adult or child or child seat in the vehicle seat 12, that is, a vacant seat. The second threshold weight $W_2$ is set in the range of from about 5 pounds to about 15 pounds.

The weight sensor 14 provides an output signal over a lead wire 22 to the controller 24. The controller 24 is operative to determine whether actuation of the inflator should be disabled or enabled, in the manner described below.

The apparatus 10 also includes a door switch 26. The door switch 26 is actuatable upon opening and closing of a door adjacent the vehicle seat 12. The door switch 26 outputs an appropriate signal over a lead wire to the controller 24. The apparatus 10 also includes the vehicle ignition switch 28. The ignition switch 28 outputs an appropriate signal over a lead wire to the controller 24 upon the vehicle ignition being turned off or on.

The apparatus 10 includes a memory 30, which may be part of the controller 24. The memory 30 is operative to remember, even when the vehicle ignition is turned off, whether actuation of the inflator 20 is enabled or disabled. The apparatus 10 also includes a clock or timer 32, which may also be part of the controller 24.

Figure 2:
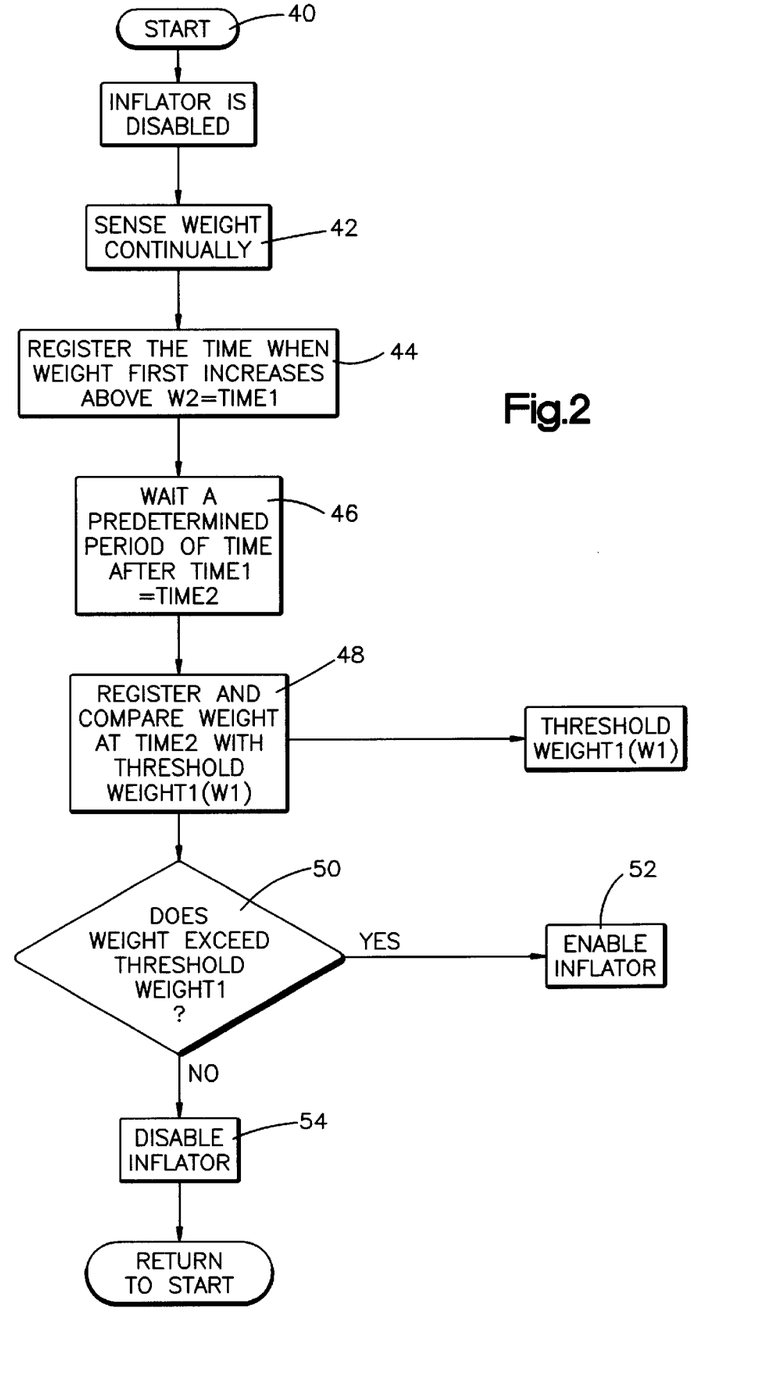
FIG. 2 is a flow chart illustrating steps of a process performed within the apparatus of FIG. 1.

FIG. 2 is a flow diagram of a process, or method, performed within the apparatus of FIG. 1. The process is initiated at a start condition (block 40) when the vehicle ignition is first turned on with no occupant or child seat in the vehicle seat 12. (If the vehicle ignition is turned on or the door is opened with an adult occupant in the vehicle seat 12, a different set of conditions applies, as discussed below with reference to FIG. 6.) In the start condition, the weight sensor 14 outputs an initial signal having an initial value, or default value, less than the second threshold weight $W_2$, which is indicative of a vacant seat 12. The state of actuation of the inflator 20 is in a default condition in which actuation of the inflator is disabled by the controller 24, that is, the inflator can not be actuated even in the event of a vehicle collision.

Thereafter, the seated weight on the vehicle seat 12 is monitored continually, as noted at block 42. At some point in time during operation of the vehicle, a child or adult may sit on the vehicle seat 12, or a child seat may be placed on the vehicle seat 12. At that point in time, the weight sensor 14 registers an increase in the seated weight, to a weight above $W_2$, as noted at block 44. This fact (of the increase in seated weight above $W_2$) is stored in the memory 30 by the controller 24. The time at which this increase occurs, time $T_1$, is also stored in the memory 30 by the controller 24.

The apparatus 10 then waits a predetermined period of time after time $T_1$, as noted at block 46, until a time $T_2$. The seated weight continues to be monitored. After the predetermined period of time, that is, at time $T_2$, the controller 24 compares the seated weight with the first threshold weight $W_1$, as indicated at block 48.

The controller 24 determines, as indicated at block 50, whether the seated weight at time $T_2$ exceeds the first threshold weight $W_1$. If the seated weight at time $T_2$ is determined to be above $W_1$, the apparatus 10 assumes there is an adult present on the vehicle seat 12, and the condition of actuation of the air bag inflator is set to "enabled", as indicated at block 52. On the other hand, if the seated weight at time $T_2$ is determined to be below $W_1$, the apparatus 10 assumes there is no adult present in the vehicle seat 12, and the inflator 20 is maintained in the disabled condition, as indicated at block 54.

Figure 3:
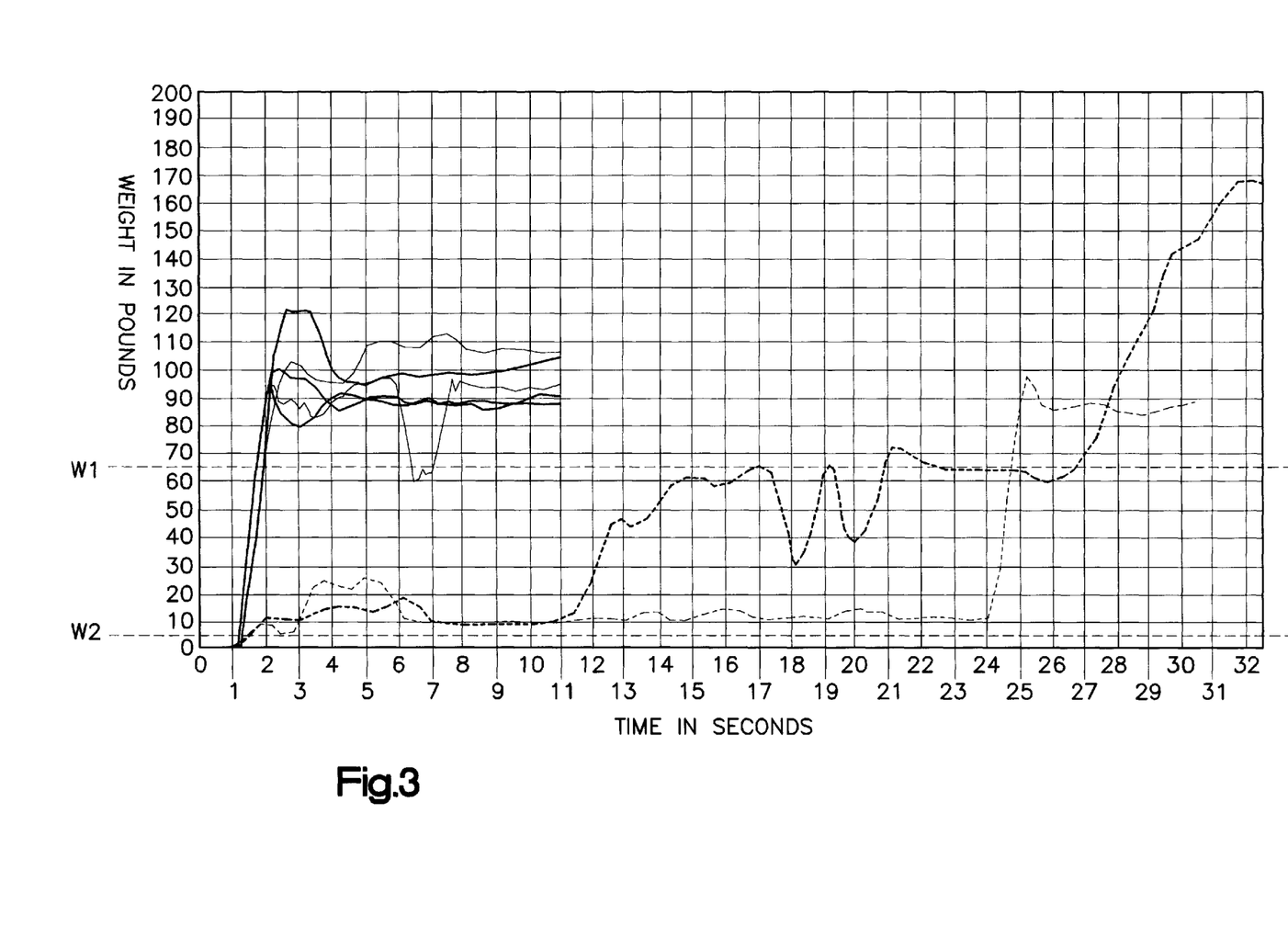
FIG. 3 is a graphical illustration of seated weight as a function of time for a plurality of different seated occupant scenarios.

In this manner, the apparatus 10 uses a measurement of the time period over which the weight of an adult is applied to a vehicle seat to classify the occupant of the seat 12—that is, to help discriminate between an adult, on the one hand, and a child or child seat, on the other hand. As an example, FIG. 3 is a graph illustrating the seated weight on a vehicle seat, as measured over time. The horizontal axis illustrates time in units of one second. The vertical axis illustrates seated weight, in units of 10 pounds. The first threshold weight $W_1$ and the second threshold weight $W_2$ are also indicated. These thresholds may vary depending upon the vehicle/seat system employed.

Each one of the solid lines in FIG. 3 represents the seated weight of one of a plurality of adults sitting down on the vehicle seat, as measured over time. Each one of the dashed lines represents the seated weight on the vehicle seat in accordance with another seating scenario. For example, the lighter dashed line represents seated weight when a child seat is placed on the vehicle seat and the child, at about 24 seconds, sits in the child seat. The heavier dashed line represents seated weight when a child seat is placed on the vehicle seat, the child seat is lightly cinched down at about three to six seconds, the child is seated at about 12–20 seconds, and final cinching efforts are undertaken at about 27 seconds.

FIG. 3 shows that when an adult sits down on the vehicle seat (solid lines), the seated weight increases from $W_2$ (5–15 pounds) to $W_1$ (60–80 pounds) within a period of one to three seconds, and typically in less than two seconds. The shape of the dashed lines shows that in some cases involving a child seat, the seated weight also increases from $W_2$ (5–15 pounds) to $W_1$ (60–80 pounds), that is, to an amount over the weight threshold that normally indicates the presence of an adult. This may occur, for example, if an adult kneels on a child seat to cinch it in place, or if a relatively large child sits in a child seat. In these cases, however, the seated weight does not increase from $W_2$ to $W_1$ within a period of one to three seconds. Instead, the seat weight steps up in a series of weight increases over a period of time that is substantially longer than three seconds.

Thus, it can be seen that a decision as to whether to enable or disable actuation of an occupant protection device can be made through the following process. First, determine when the value of the output signal of the weight sensor rises from an initial value. Wait a predetermined period of time after the value of the output signal rises from the initial value. Determine the weight on the vehicle seat after the predetermined period of time. Then, compare the weight on the vehicle seat after the predetermined period of time with a first threshold weight. Actuation of the occupant protection device is enabled if the weight on the vehicle seat after the predetermined period of time exceeds the first threshold weight. Actuation of the occupant protection device is disabled if the weight on the vehicle seat does not exceed the first threshold weight after the predetermined period of time. The predetermined period of time in the illustrated embodiment is about one to about three seconds, preferably about two seconds.

Figure 4:
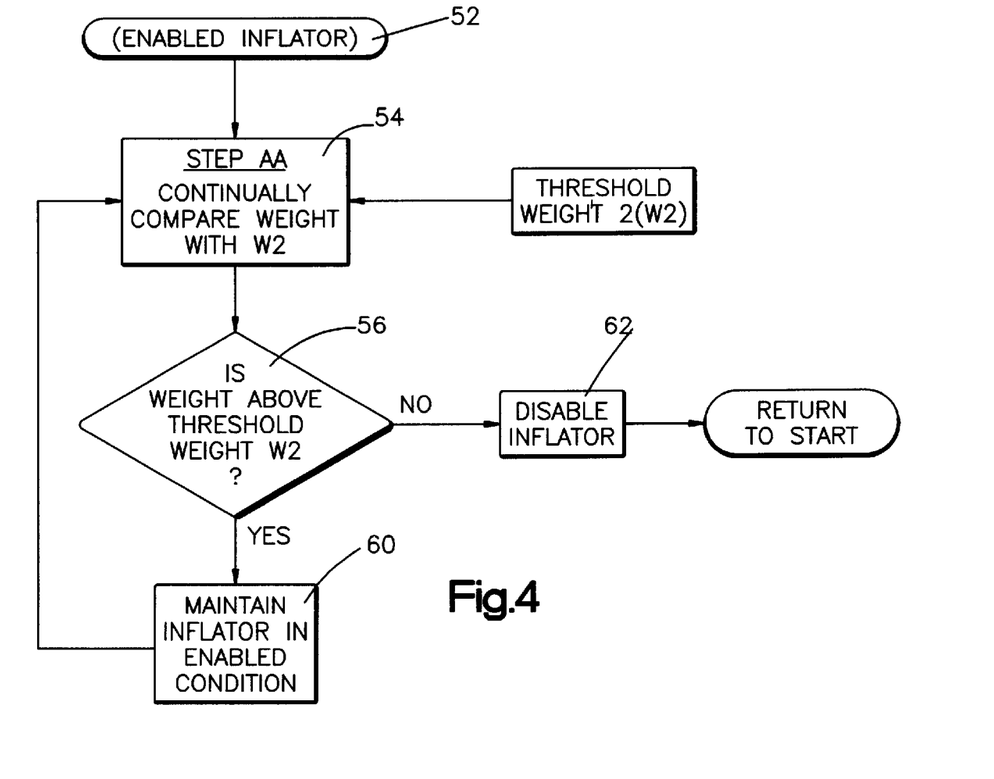
FIGS. 4–6 are flow charts illustrating further steps of the process performed within the apparatus of FIG. 1.

FIG. 4 illustrates another portion of the process performed within the apparatus of FIG. 1. Once the inflator is in the enabled condition (block 52), the apparatus 10 continues to monitor seated weight on the vehicle seat. The seated weight is continually compared at Step AA (block 54) to the second threshold weight $W_2$. $W_2$ is a weight indicative of a vacant vehicle seat, typically a seated weight of no more than 5 to 15 pounds. The controller 24 determines (block 56) whether the seated weight is above $W_2$.

As long as the seated weight after $T_2$ remains above the second threshold weight $W_2$, the apparatus 10 assumes (block 60) that there is still an adult present in the vehicle seat 12, and maintains the air bag in the enabled condition. Any change in weight short of dropping to the 5–15 pounds threshold weight $W_2$ is not considered to be indicative of vacating the seat 12. This is based on the assumption that in order to put a child seat into a seat currently occupied by an adult, the adult must first vacate the seat entirely, thus dropping the seated weight below $W_2$. In some cases when an adult is seated, the seated weight might temporarily drop, for example, to 40 pounds or less, because the adult leans on an armrest. This is not, however, an event for which actuation of the inflator 20 should be disabled.

If the seated weight at any time after $T_2$ does drop below $W_2$, the apparatus 10 assumes that there is no longer an adult present. As a result, the condition of actuation of the inflator is changed to the disabled condition as shown at block 62, and the apparatus 10 returns to the start condition at block 40 (FIG. 2).

Figure 5:
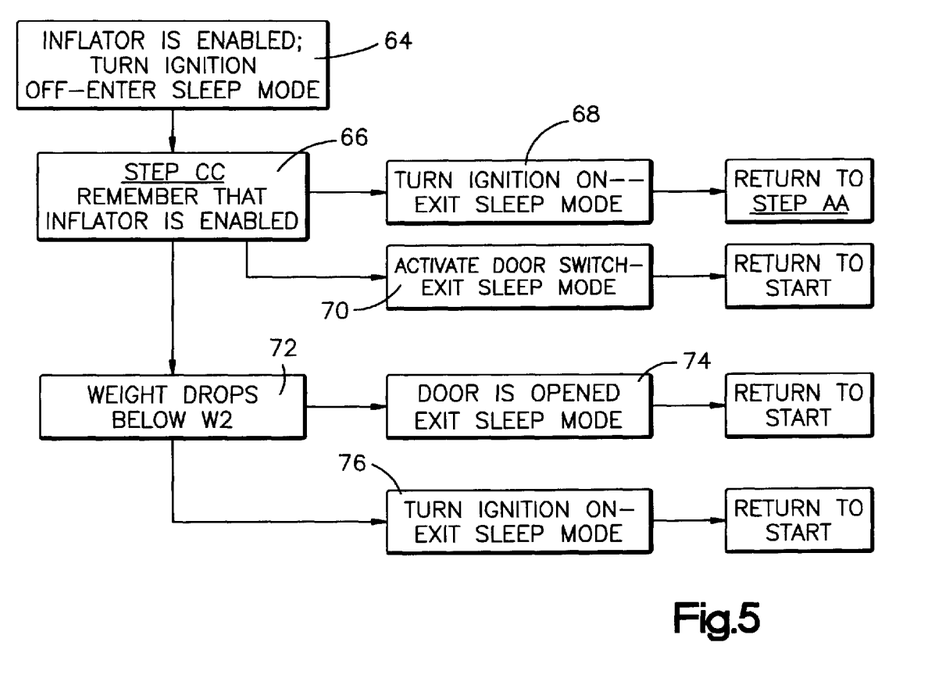

FIG. 5 illustrates still another portion of the process that is performed within the apparatus 10. This portion of the process occurs if the vehicle ignition switch 28 is turned off (block 64) when the inflator 20 is in the enabled condition. After a predetermined period of time, for example, 15 to 30 minutes, if the signal from the door switch 26 indicates that the vehicle door is closed, the process goes to Step CC (block 66), and the apparatus 10 enters a sleep mode. The apparatus 10 enters the sleep mode whenever the vehicle ignition switch 28 is off, and the vehicle door switch 26 is closed, and no activity occurs for the predetermined period of time.

When the apparatus 10 is in the sleep mode, the seated weight sensor 14, the vehicle condition sensors 16, and the occupant condition sensors 18 are not powered, or are powered at a minimal current, to minimize battery drain. The memory 30 remembers or stores the fact that the inflator 20 was last in the enabled condition before the ignition switch 28 was turned off.

When the apparatus 10 is in the sleep mode, the next meaningful occurrence after the ignition switch being turned off is either the ignition switch 28 being turned back on or the door switch 26 being actuated when the vehicle door is opened.

If the next meaningful occurrence is the ignition switch being turned on (block 68), the apparatus is fully powered up and exits sleep mode. Similarly, if the next meaningful occurrence is the door switch 26 being actuated (block 70) because the vehicle door is opened, the apparatus 10 exits sleep mode. In either case, because the memory 30 has stored the fact that the inflator 20 was last in the enabled condition, the apparatus 10 assumes the continued presence of a seated adult, and loops back to Step AA (block 54).

Additionally, after the ignition switch 20 is turned off and the apparatus 10 is in the sleep mode, the weight on the seat may drop below the second threshold weight $W_2$ (block 72), for example, an occupant of a van moving to the back of the van. In this case, the apparatus 10 does nothing and the inflator remains in the enabled condition. If the vehicle door is opened (block 74) after the seated weight drops below the second threshold weight $W_2$, the apparatus 10 exits sleep mode and determines that the vehicle seat 12 has been vacated. The process returns to the start condition at block 40 (FIG. 2). If the vehicle door is not opened after the seated weight drops below the second threshold weight $W_2$, it is not considered a problem for the inflator to remain in the enabled condition with a vacant seat, because the ignition is not on and, therefore, the car is not moving. When the vehicle ignition is later turned on (block 76), the apparatus 10 exits sleep mode and the system returns to the start condition at block 40 (FIG. 2).

Figure 6:
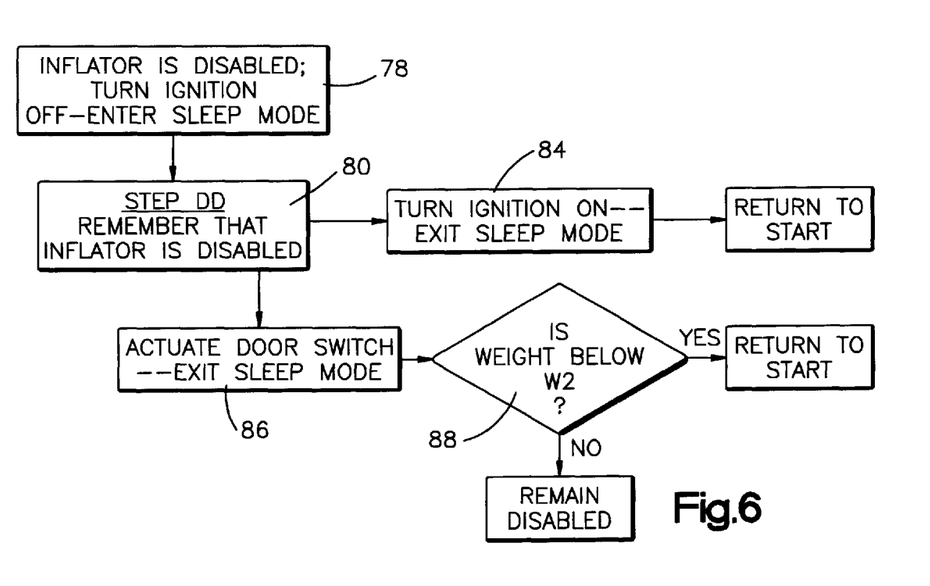

FIG. 6 illustrates yet another portion of the process that is performed within the apparatus 10. This portion of the process occurs if the vehicle ignition switch 28 is turned off (block 78) when the inflator 20 is in the disabled condition after the apparatus 10 has sensed some weight increase (above $W_2$) but not enough to signify the presence of an adult (not above $W_1$). When this situation occurs, the apparatus 10 goes to step DD (block 80) and enters sleep mode. The sensors are powered down, but the memory 30 remembers or stores the fact that the inflator 20 was last in the disabled condition before the ignition switch 28 was turned off.

If the next meaningful occurrence after the ignition switch 28 is turned off is the ignition switch being turned back on (block 84), the apparatus 10 is powered up and exits sleep mode, loops back to the start condition at block 40, and maintains the inflator 20 in the disabled condition.

Alternatively, if the next meaningful occurrence is the door switch being actuated (block 86) when the vehicle door is opened, the apparatus 10 exits sleep mode. The seated weight is, thereafter, continually sensed and compared to the second threshold weight $W_2$ (block 88). If the seated weight drops below $W_2$, the apparatus 10 returns to the start condition (block 40). Otherwise, the inflator 20 is maintained in the disabled condition. Specifically, actuation of the inflator 20 is not enabled even if the weight increases to a weight above $W_1$, because the apparatus 10 remembers that the seated weight never went down below $W_2$, and so there must still be a child seat present, such as a rear facing infant seat.

On the other hand, if the seated weight rises above $W_1$ in the predetermined time period, the apparatus 10 assumes that the vehicle seat 12 has been occupied by an adult sitting down, and actuation of the inflator 20 is enabled. (This sequence of events assumes that the vehicle ignition 28 can not be turned on until the door is opened and the door switch 26 is actuated.) If the vehicle ignition 28 is turned off with an adult occupant already in the vehicle seat 12, the controller 24 maintains the inflator 20 in the enabled condition. Thus, if an adult occupant stays in the vehicle seat, or if the vehicle ignition 28 is turned on with an adult occupant already in the vehicle seat 12, the inflator 20 is maintained in the enabled condition.

Figure 7:
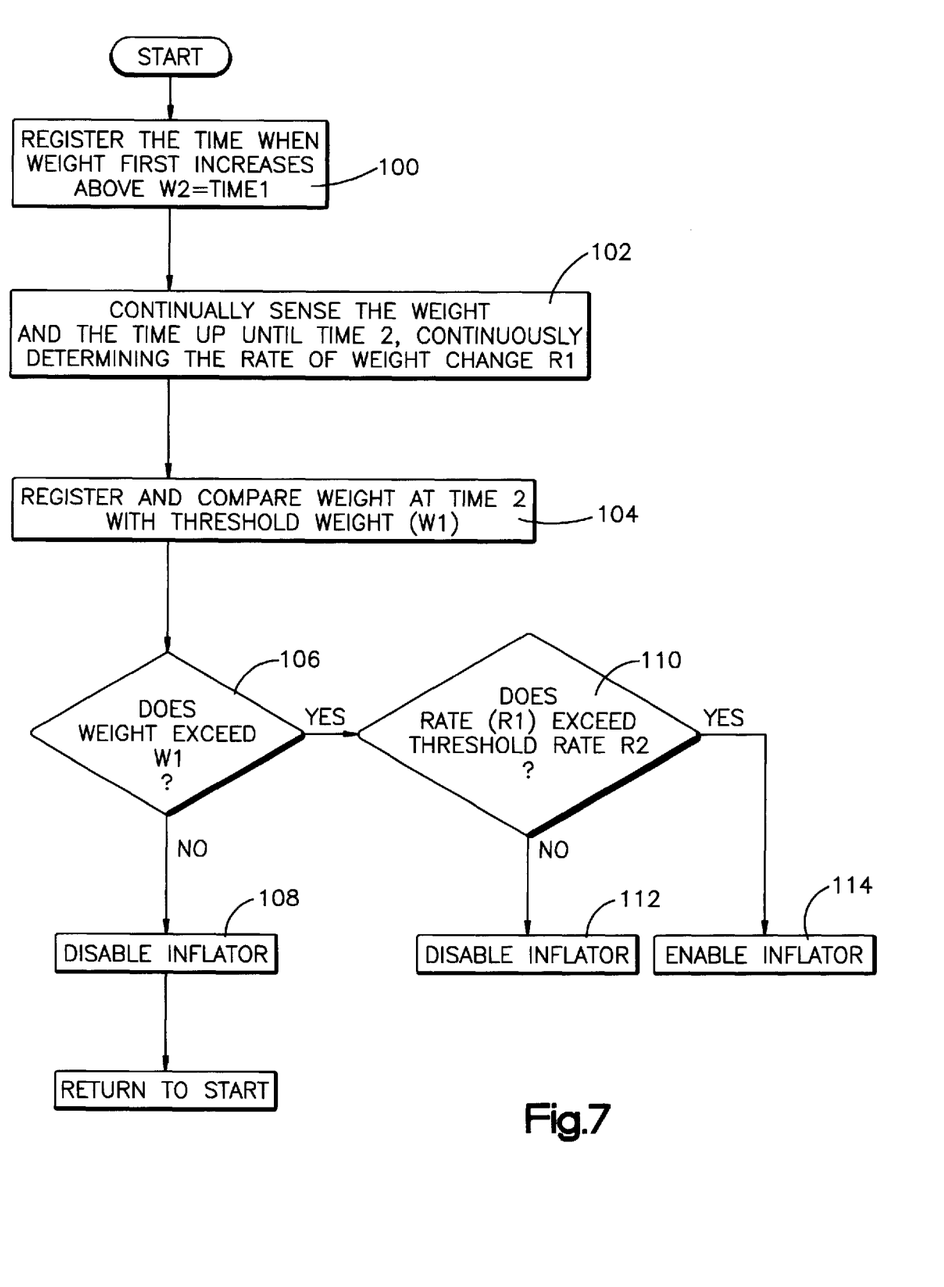
FIG. 7 is a flow chart illustrating steps of a process performed within an apparatus in accordance with a second embodiment of the invention.

FIG. 7 illustrates an additional decision point for determining whether actuation of the inflator is to be enabled or disabled. The method shown in FIG. 7 can be performed within the apparatus 10 of FIG. 1. The additional decision point may be used to increase the accuracy or robustness of the previously described method, or it may be needed in certain seating geometries where the first weight threshold ($W_1$) may be very close to the weight of a child in a child seat. In this method, the apparatus 10 uses a measurement of the rate of weight increase on the vehicle seat 12, in addition to a determination of the weights $W_1$ and $W_2$ at times $T_1$ and $T_2$, to discriminate between an adult sitting in the vehicle seat and other occurrences.

Specifically, the apparatus 10 registers (block 100) the time $T_1$, as described above, when the seated weight exceeds the second threshold weight $W_2$. The apparatus 10 then continually monitors (block 102) the seated weight. Specifically, the apparatus 10 continually senses the weight and the time up until Time 2, continually determining the rate of weight change ($R_1$) on the vehicle seat 12. The controller also (step 104) registers and compares the weight at Time 2 with the threshold weight $W_1$.

The controller makes a determination (block 106) of whether the sensed weight at Time 2 is above the threshold weight $W_1$. If the sensed weight at Time 2 does not exceed the first threshold weight $W_1$, then the inflator is disabled or is maintained in the disabled condition (block 108), and the system returns to the start condition.

If the sensed weight at Time 2 does exceed the first threshold weight W1, then the controller also compares (block 110) the rate of increase ($R_1$) of the seated weight over time with a threshold rate of weight increase $R_2$. The threshold rate $R_2$ is a rate indicative of the rate of weight increase that occurs when an adult sits on a vehicle seat, typically, 70 pounds per second or more.

If the sensed rate of weight increase $R_1$ does not exceed $R_2$, even thought the first threshold weight $W_1$ has been exceeded, the apparatus 10 assumes that no adult has been seated in the vehicle seat 12, and actuation of the air bag inflator 20 is disabled (block 112). If it is determined that $R_1$ does exceed $R_2$, and that the first threshold weight $W_1$ has been exceeded, then the apparatus 10 assumes that an adult has been seated in the vehicle seat 12, and actuation of the air bag inflator 20 is enabled (block 114).

The circumstances described above are exemplary of those in which the present invention is useful. An apparatus in accordance with the present invention can include a controller programmed with particular algorithms to handle different combination of events other than as described above, such as the placement or removal of a child seat at different times in the operating cycle of the vehicle, people of different weights getting into or out of the vehicle, etc. As another example, if the vehicle is not started within 30 minutes of door closure, the system could enter sleep mode, for example.

From the above description of the invention, those skilled in the art will perceive improvements, changes and modifications in the invention. For example, the weight sensor may be of any type including the strain sensor type. Two separate controllers may be provided, one for the enabling and disabling of actuation of the inflator, and one for the inflator actuation itself. The door switch and the vehicle ignition switch need not be included in an apparatus or method in accordance with the invention. A buckle switch or a seat belt tension sensor could be incorporated. Such improvements, changes and modifications within the skill of the art are intended to be covered by the appended claims.

Having described the invention, we claim:

1. A method of controlling the enabling and disabling of actuation of a protection device for an occupant of a vehicle seat having a weight sensor, said method comprising the steps of:

sensing the weight on the vehicle seat and providing an output signal indicative of the sensed weight, the output signal having an initial value;

determining when the value of the output signal of the weight sensor rises from the initial value;

actuating a timer in response to the output signal rising from the initial value;

waiting a predetermined period of time, determined by the timer, after the value of the output signal rises from the initial value;

determining the weight on the vehicle seat after the predetermined period of time; and, comparing the weight on the vehicle seat after the predetermined period of time with a first threshold weight and, as a result, either (a) enabling actuation of the protection device if the weight on the vehicle seat after the predetermined period of time exceeds the first threshold weight, or (b) disabling actuation of the protection device if the weight on the vehicle seat after the predetermined period of time does not exceed the first threshold weight.

2. A method as set forth in claim 1 wherein the first threshold weight is a weight indicative of the presence of an adult on the vehicle seat.

3. A method as set forth in claim 1 further comprising the steps of:

determining the weight on the vehicle seat when the protection device is actuated, and comparing the weight on the vehicle seat with a second threshold weight less than the first threshold weight and, as a result, either (a) maintaining actuation of the protection device if the weight on the vehicle seat exceeds the second threshold weight, or (b) disabling actuation of the protection device if the weight on the vehicle seat does not exceed the second threshold weight.

4. A method as set forth in claim 3 wherein the first threshold weight is a weight indicative of the presence of an adult on the vehicle seat.

5. A method as set forth in claim 4 wherein the second threshold weight is a weight indicative of a vacant vehicle seat.

6. A method of controlling enabling and disabling of actuation of a protection device for an occupant of a vehicle seat having a weight sensor, said method comprising the steps of:
   continually sensing the weight on the vehicle seat and providing an output signal indicative of the sensed weight;
   determining the rate of increase of the weight on the vehicle seat and providing an output signal indicative of the rate of increase;
   comparing the rate of increase of the weight on the vehicle seat with a first threshold rate;
   enabling actuation of the protection device if the rate of increase of the weight on the vehicle seat exceeds the first threshold rate; and
   disabling actuation of the protection device if the rate of increase of the weight on the vehicle seat does not exceed the first threshold rate.

7. A method as set forth in claim 6 wherein the first threshold rate is a rate of weight increase indicative of an adult sitting on the vehicle seat.

8. An apparatus for controlling enabling and disabling of actuation of a protection device for an occupant of a vehicle seat having a weight sensor, said apparatus comprising:
   a sensor for sensing the weight on the vehicle seat and for providing an output signal indicative of the sensed weight, the output signal having an initial value;
   means for determining when the value of the output signal of the weight sensor rises from the initial value;
   a timer actuatable in response to the output signal rising from the initial value and outputting a signal a predetermined period of time after being actuated;
   means for determining the weight on the vehicle seat at the predetermined period of time in response to receiving the signal from the timer; and
   means for comparing the weight on the vehicle seat after the predetermined period of time with a first threshold weight and, as a result, either (a) enabling actuation of the protection device if the weight on the vehicle seat after the predetermined period of time exceeds the first threshold weight, or (b) disabling actuation of the protection device if the weight on the vehicle seat after the predetermined period of time does not exceed the first threshold weight.

9. An apparatus as set forth in claim 8 wherein the first threshold weight is a weight indicative of the presence of an adult on the vehicle seat.

10. An apparatus as set forth in claim 8 comprising means for comparing the weight on the vehicle seat, when actuation of the protection device is enabled, with a second threshold weight less than the first threshold weight and, as a result, either (a) maintaining actuation of the protection device if the weight on the vehicle seat exceeds the second threshold weight, or (b) disabling actuation of the protection device if the weight on the vehicle seat does not exceed the second threshold weight.

11. A method as set forth in claim 10 wherein the second threshold weight is a weight indicative of a vacant vehicle seat.

12. An apparatus for controlling enabling and disabling of actuation of a protection device for an occupant of a vehicle seat having a weight sensor, said apparatus comprising:
   means for continually sensing the weight on the vehicle seat and providing an output signal indicative of the sensed weight;
   means for determining the rate of increase of the weight on the vehicle seat and providing an output signal indicative of the rate of increase; and
   means for comparing the rate of increase of the weight on the vehicle seat with a first threshold rate and for either (a) enabling actuation of the protection device if the rate of increase of the weight on the vehicle seat exceeds the first threshold rate, or (b) disabling actuation of the protection device if the rate of increase of the weight on the vehicle seat does not exceed the first threshold rate.

13. An apparatus as set forth in claim 12 wherein the first threshold rate is a rate of weight increase indicative of an adult sitting on the vehicle seat.

14. A method of controlling the enabling and disabling of actuation of a protection device for an occupant of a vehicle seat having a weight sensor in a vehicle having an ignition, said method comprising the steps of:
   continually sensing the weight on the vehicle seat and providing an output signal indicative of the sensed weight, the output signal having an initial value;
   determining when the value of the output signal of the weight sensor rises from the initial value;
   waiting a predetermined period of time after the value of the output signal rises from the initial value;
   determining the weight on the vehicle seat after the predetermined period of time;
   comparing the weight on the vehicle seat after the predetermined period of time with a first threshold weight and, as a result, either (a) enabling actuation of the protection device if the weight on the vehicle seat after the predetermined period of time exceeds the first threshold weight, or (b) disabling actuation of the protection device if the weight on the vehicle seat after the predetermined period of time does not exceed the first threshold weight;
   providing a controller with a memory; and
   maintaining in the memory, when the vehicle ignition is turned off, a value indicative of the state of actuation of the inflator.

15. A method as set forth in claim 14 further comprising the steps of:
   determining the weight on the vehicle seat when the vehicle ignition is turned off; and thereafter, upon actuation of a door switch of the vehicle or upon the vehicle ignition being turned on,
   comparing the weight on the vehicle seat with a second threshold weight less than the first threshold weight and, as a result, either (a) disabling actuation of the protection device if the weight on the vehicle seat does not exceed the second threshold weight, or (b) enabling or maintaining actuation of the protection device if the weight continues to exceed the first threshold weight.

16. A method of controlling the enabling and disabling of actuation of a protection device for an occupant of a vehicle seat having a weight sensor in a vehicle having an ignition and a door switch, said method comprising the steps of:

continually sensing the weight on the vehicle seat and providing an output signal indicative of the sensed weight, the output signal having an initial value;

determining when the value of the output signal of the weight sensor rises from the initial value;

waiting a predetermined period of time after the value of the output signal rises from the initial value;

determining the weight on the vehicle seat after the predetermined period of time;

comparing the weight on the vehicle seat after the predetermined period of time with a first threshold weight and, as a result, either (a) enabling actuation of the protection device if the weight on the vehicle seat after the predetermined period of time exceeds the first threshold weight, or (b) disabling actuation of the protection device if the weight on the vehicle seat after the predetermined period of time does not exceed the first threshold weight;

providing a controller with a memory and maintaining in the memory, when the vehicle ignition is turned off, a value indicative of the state of actuation of the inflator;

determining the weight on the vehicle seat in response to actuation of the door switch when the vehicle ignition is turned off; and thereafter comparing the weight on the vehicle seat with a second threshold weight less than the first threshold weight and, as a result, disabling actuation of the protection device if the weight on the vehicle seat does not exceed the second threshold weight.

17. A method of controlling the enabling and disabling of actuation of a protection device for an occupant of a vehicle seat having a weight sensor, said method comprising the steps of:

continually sensing the weight on the vehicle seat and providing an output signal indicative of the sensed weight, the output signal having an initial value;

determining when the value of the output signal of the weight sensor rises from the initial value;

waiting a predetermined period of time after the value of the output signal rises from the initial value;

determining the weight on the vehicle seat after the predetermined period of time;

comparing the weight on the vehicle seat after the predetermined period of time with a first threshold weight and, as a result, either (a) enabling actuation of the protection device if the weight on the vehicle seat after the predetermined period of time exceeds the first threshold weight, or (b) disabling actuation of the protection device if the weight on the vehicle seat after the predetermined period of time does not exceed the first threshold weight;

determining the rate of increase of the weight on the vehicle seat and providing an output signal indicative of the rate of increase;

comparing the rate of increase of the weight on the vehicle seat with a first threshold rate;

enabling actuation of the protection device if the rate of increase of the weight on the vehicle seat exceeds the first threshold rate; and disabling actuation of the protection device if the rate of increase of the weight on the vehicle seat does not exceed the first threshold rate.

18. A method as set forth in claim 17 wherein the first threshold rate is a rate of weight increase indicative of an adult sitting on the vehicle seat.

19. An apparatus for controlling enabling and disabling of actuation of a protection device for an occupant of a vehicle seat having a weight sensor in a vehicle having an ignition switch, said apparatus comprising:

a sensor for sensing the weight on the vehicle seat and for providing an output signal indicative of the sensed weight, the output signal having an initial value;

means for determining when the value of the output signal of the weight sensor rises from the initial value;

means for determining the weight on the vehicle seat at a predetermined period of time after the value of the output signal rises from the initial value;

means for comparing the weight on the vehicle seat after the predetermined period of time with a first threshold weight and, as a result, either (a) enabling actuation of the protection device if the weight on the vehicle seat after the predetermined period of time exceeds the first threshold weight, or (b) disabling actuation of the protection device if the weight on the vehicle seat after the predetermined period of time does not exceed the first threshold weight;

a controller with a memory for maintaining, when the vehicle ignition is turned off, a value indicative of the state of actuation of the inflator; and means for determining the weight on the vehicle seat when the vehicle ignition is turned off, and for, thereafter, comparing the weight on the vehicle seat with a second threshold weight less than the first threshold weight and, as a result, disabling actuation of the protection device if the weight on the vehicle seat does not exceed the second threshold weight.

20. An apparatus for controlling enabling and disabling of actuation of a protection device for an occupant of a vehicle seat having a weight sensor in a vehicle having an ignition and a door switch, said apparatus comprising:

a sensor for sensing the weight on the vehicle seat and for providing an output signal indicative of the sensed weight, the output signal having an initial value;

means for determining when the value of the output signal of the weight sensor rises from the initial value;

means for determining the weight on the vehicle seat at a predetermined period of time after the value of the output signal rises from the initial value;

means for comparing the weight on the vehicle seat after the predetermined period of time with a first threshold weight and, as a result, either (a) enabling actuation of the protection device if the weight on the vehicle seat after the predetermined period of time exceeds the first threshold weight, or (b) disabling actuation of the protection device if the weight on the vehicle seat after the predetermined period of time does not exceed the first threshold weight;

a controller with a memory for maintaining, when the vehicle ignition is turned off, a value indicative of the state of actuation of the inflator; and means for determining the weight on the vehicle seat in response to actuation of the door switch when the vehicle ignition is turned off, and for, thereafter, comparing the weight on the vehicle seat with a second threshold weight less than the first threshold weight and, as a result, disabling actuation of the protection device if the weight on the vehicle seat does not exceed the second threshold weight.

21. An apparatus for controlling enabling and disabling of actuation of a protection device for an occupant of a vehicle seat having a weight sensor, said apparatus comprising:
- a sensor for sensing the weight on the vehicle seat and for providing an output signal indicative of the sensed weight, the output signal having an initial value;
- means for determining when the value of the output signal of the weight sensor rises from the initial value;
- means for determining the weight on the vehicle seat at a predetermined period of time after the value of the output signal rises from the initial value;
- means for comparing the weight on the vehicle seat after the predetermined period of time with a first threshold weight and, as a result, either (a) enabling actuation of the protection device if the weight on the vehicle seat after the predetermined period of time exceeds the first threshold weight, or (b) disabling actuation of the protection device if the weight on the vehicle seat after the predetermined period of time does not exceed the first threshold weight; and
- means for comparing the rate of increase of the weight on the vehicle seat with a first threshold rate and for either (a) enabling actuation of the protection device if the rate of increase of the weight on the vehicle seat exceeds the first threshold rate, or (b) disabling actuation of the protection device if the rate of increase of the weight on the vehicle seat does not exceed the first threshold rate.

22. An apparatus as set forth in claim 21 wherein the first threshold rate is a rate of weight increase indicative of an adult sitting on said vehicle seat.

23. A method of controlling the enabling and disabling of actuation of a protection device associated with a vehicle seat having a weight sensor, said method comprising the steps of:
- sensing weight applied to the vehicle seat;
- beginning a time measurement when the weight applied to the vehicle seat increases above a first threshold weight, the first threshold weight being less than a weight that is indicative of the presence on the vehicle seat of a child seat;
- enabling actuation of the protection device if the weight applied to the vehicle seat increases from the first threshold weight to a second threshold weight prior to the time measurement reaching a threshold time value, the second threshold weight being indicative of the presence on the vehicle seat of an occupant that does not require a child seat; and
- disabling actuation of the protection device if the weight applied to the vehicle seat does not increase from the first threshold weight to the second threshold weight prior to the time measurement reaching the threshold time value.

24. A method as set forth in claim 23 for use in a vehicle having an ignition and further comprising the steps of:
- providing a controller with a memory and maintaining in the memory, when the vehicle ignition is turned off, a value indicative of the state of actuation of the inflator;
- determining the weight on the vehicle seat in response to actuation of a door switch when the vehicle ignition is turned off; and thereafter
- comparing the weight on the vehicle seat with the first threshold weight; and
- disabling actuation of the protection device if the weight on the vehicle seat does not exceed the first threshold weight.

25. A method of controlling the enabling and disabling of actuation of a protection device associated with a vehicle seat having a weight sensor, said method comprising the steps of:
- beginning a time measurement when weight is applied to the vehicle seat;
- sensing the weight applied to the vehicle seat;
- enabling actuation of the protection device if the weight applied to the vehicle seat reaches a threshold weight prior to the time measurement reaching a threshold time value; and
- disabling actuation of the protection device if the weight applied to the vehicle seat does not reach the threshold weight prior to the time measurement reaching the threshold time value.

* * * * *